Patented Dec. 10, 1940

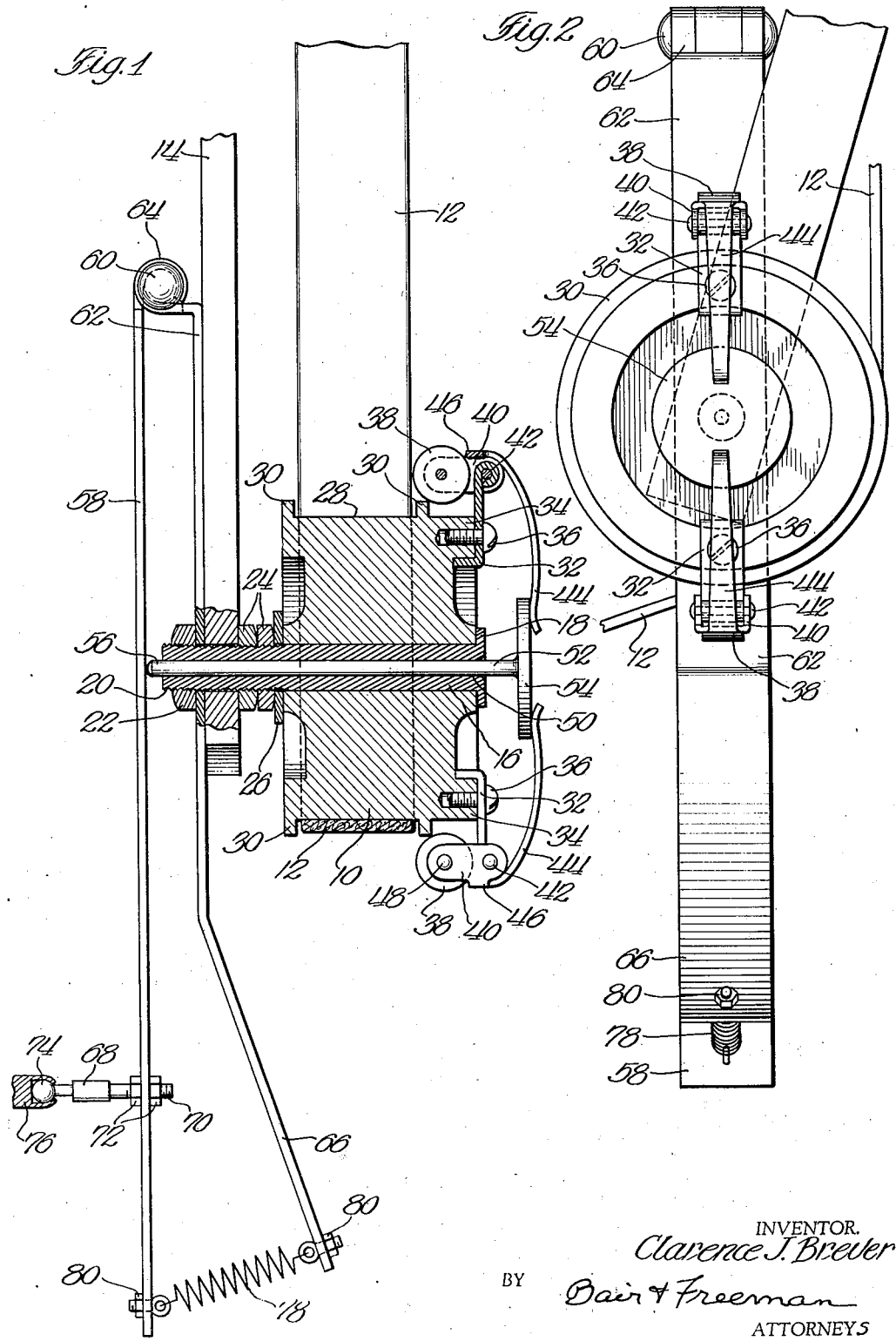

2,224,507

UNITED STATES PATENT OFFICE 2,224,507

ENGINE GOVERNOR

Clarence J. Brever, Browerville, Minn.

Application November 28, 1938, Serial No. 242,795

1 Claim. (Cl. 264—2)

My invention relates to governors in general and particularly those of a type which can be used to actuate engine controls.

Among the objects of my invention is the provision of a new and improved governor device which is simple in construction, relatively cheap to manufacture and which utilizes substantially a minimum number of elements.

Another object of my invention is the provision of a new and improved engine governor device which is actuated directly by the fan belt of a motor.

Still another object is the provision of a new and improved engine governor device which can be mounted upon the framework of an engine at a convenient location so that it may be driven by the fan belt which utilizes a simplified lever arrangement whereby the action of the governor directly influences a control rod for the engine throttle valve.

A further object is the provision of a new and improved engine governor control embodied in an idler pulley designed to be actuated by the fan belt upon which are positioned centrifugal type weight members so arranged that they are capable of reciprocating a pin mounted concentrically within the idler pulley to which is attached a suitable linkage for transferring the motion from the governor to an engine throttle valve control rod.

With these and other objects in view, my invention consists in the construction, arrangement and combination of the various parts of my device whereby the objects contemplated are attained, as hereinafter more fully set forth, pointed out in my claim and illustrated in the accompanying drawing, in which:

Figure 1 is a longitudinal view of my device showing the governor mechanism in section.

Figure 2 is a right end view of my device.

In governing combustion engines it is frequently advantageous to provide a means for shifting the setting of the throttle valve independently of the manually actuated accelerator control. To provide such a means and at the same time maintain the simplest possible arrangement and number of parts it becomes essential to locate the governor somewhere near the throttle valve so that reasonably direct connections may be made.

Also, when it is desirable to immediately and directly influence the speed of a combustion engine without permitting any lag in the action of the governor behind engine activity it is found to be especially advantageous to actuate the governor by the fan belt so that it becomes directly and immediately responsive to the speed of the engine.

In the embodiment of my invention here shown I have provided a pulley wheel 10 designed to cooperate with a fan belt 12, the pulley wheel being mounted upon an extension bracket 14 so that it may be shifted about into a desired position in connection with the fan belt.

The pulley wheel itself is secured to the extension bracket 14 by means of a specially formed axle 16 which is provided with a flanged end 18 for holding the pulley and a threaded end 20 adapted to be screw threaded into the extension bracket. To complete the mounting of the wheel and axle upon the bracket there is provided a nut 22 on one side of the bracket and a pair of lock nuts 24 at the other side designed to securely position the axle immovably upon the bracket.

Between the lock nuts 24 and the adjacent face of the pulley wheel there is provided a washer 26 to prevent the wheel from rubbing against the outermost lock nut. The pulley wheel itself is provided with a groove 28 adapted to receive the fan belt 12 and a pair of flanges 30 on opposite sides for holding the belt in place, though of course it is to be presumed that the pulley wheel may be made of a type designed to receive a V-shaped belt as readily as the flat belt shown.

The governor mechanism associated with the idler pulley wheel includes a pair of angle brackets 32 secured respectively to projections 34 on diametrically opposed sides of the pulley wheel by means of screws 36. These angle brackets extend radially a short distance beyond the outer circumference of the pulley. A pair of centrifugal ball members are mounted one on each of the angle brackets, each of which comprises a ball element 38 pivotally mounted in a link 40 which in turn is pivotally mounted by means of a pin 42 upon the angle bracket 32. The link 40 in turn is provided with actuating arms 44 bearing against a shoulder 46 on the link and extending in a radial direction toward the center of the pulley wheel. The actuating arms are somewhat resilient but with sufficient rigidity to substantially maintain the conformation shown.

In the axle 18 there is provided a central aperture 50 within which is positioned a pin 52 extending entirely through the aperture. At the right hand end there is a large flange head 54 on the pin which is designed to be contacted by the actuating arms 44 in order that it may be reciprocated endwise or axially within the axis of the pulley. At its opposite end 56 the pin bears against a lever 58 which is mounted by means of a hinge 60 to the stationary portion of the device which in this case is shown to be the extension bracket 14. The other portion of the hinge is here shown to be the similarly disposed base member 62 which at the upper end is provided with an extension 64 forming a portion of the hinge 60 and at the lower end an angularly bent portion 66 located at the opposite side of the pin 52. There is an aperture in the base member 62 by means of which it is positioned upon the threaded end 20 of the axle 16 and secured thereto by means of the nut 22.

At the lower end of the lever 58 there is shown a coupling 68 secured to the lever by means of a shank 70 and lock nuts 72. This coupling is provided with a ball joint 74 which is attached to an engine throttle valve control rod 76. A coiled spring 78 is shown attached by means of the eyelet coupling 80 between the lower ends respectively of the lever 58 and the base member 62.

*Operation*

As has been described, the pulley is designed to be placed on a stationary portion of the engine adjacent the fan belt 12 so that it may be positively driven thereby. As the speed of the engine increases the centrifugal ball elements 35 are pivoted outward in a radial direction pulling the link members 40 with them, thereby pivoting the actuating arms 40 in such a direction that they press against the flange 54 of the pin 52 in a direction so as to move it from right to left. Movement of the pin in turn is transferred to the lever 58 which is pivoted about the hinge 60 in a clockwise direction. As the lever 58 moves in this direction the engine throttle valve control rod 76 is moved from right to left in order to shift the throttle valve setting in a desired direction.

When the speed of the fan belt slows down the ball elements 38 are urged radially toward the axis of the pulley by means of the resiliency inherent in the actuating arms 44. At this same time the coiled spring 78 draws the lever 58 backward in a counterclockwise direction so that the engine throttle valve control rod 76 is retracted and the lever 58 maintained uniformly in contact with the end 56 of the axially positioned pin.

By providing a governor device of simplified construction it will become apparent that the speed of the fan belt is made to directly and accurately influence the throttle valve setting so that no delay is experienced between a change in the speed of the engine and the throttle valve control.

Some changes may be made in the construction and arrangement of the parts of my device without departing from the real spirit and purpose of my invention, and it is my intention to cover by my claim any modified forms of structure, or use of mechanical equivalents, which may be reasonably included within its scope.

I claim as my invention:

An engine governor adapted to be actuated by the fan belt of an engine comprising a pulley wheel remote from the fan and means for mounting said pulley wheel on the engine in the path of the fan belt comprising a supporting bracket and a hollow sleeve extending through the wheel secured to said bracket, said wheel having a face in a plane spaced from the plane of the adjacent edge of the said belt including a flat rim, brackets having one edge bent inside the rim and extending over the rim to a point beyond the circumference thereof, and means for securing said brackets to the rim whereby said one edge resists the pull of centrifugal force, said brackets having each a hinge at the outer end substantially within the plane of said face and a pivoted weight member attached to said hinged outer end including a weight element positionable at rest against the wheel and adapted to be lifted therefrom by centrifugal force and resilient actuating arms extending over the axis of said wheel, a headed, axially movable pin in said sleeve in contact with the inner ends of said arms adapted to be actuated thereby and a spring pressed lever arm adapted to be connected with an engine throttle valve in contact with and actuated by said pin.

CLARENCE J. BREVER.